United States Patent Office 3,526,304
Patented Sept. 1, 1970

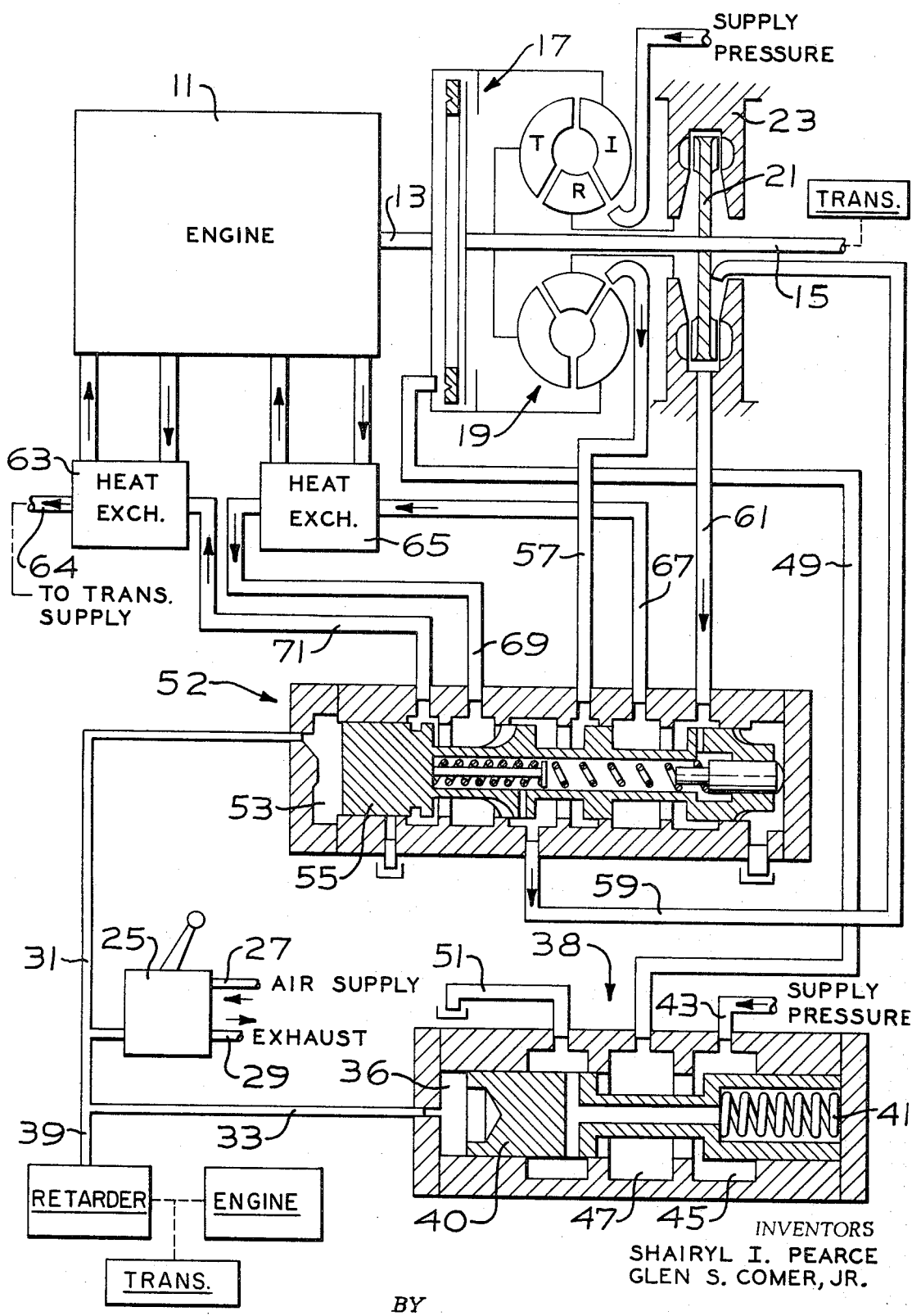

3,526,304
CONTROL SYSTEM FOR CONVERTER LOCK-UP CLUTCH AND RETARDERS
Shairyl I. Pearce, East Peoria, and Glen S. Comer, Jr., Peoria, Ill., assignors to Caterpillar Tractor Co., Peoria, Ill., a corporation of California
Filed Nov. 29, 1968, Ser. No. 779,751
Int. Cl. F16d 67/00
U.S. Cl. 192—3.23   8 Claims

ABSTRACT OF THE DISCLOSURE

A converter-retarder lock-up system for a vehicle having front and rear drive engines wherein the front transmission is directly connected to the front engine and the rear transmission is directly connected through a locked-up torque converter to the rear engine during retarding of the vehicle. The lock-up system, which includes a clutch for locking up the rear torque converter, creates an increased coolant flow through the rear engine by raising the speed of the engine to a practical value such that the fluid passing through the retarder of the rear engine is sufficiently cooled so as to eliminate the possibility of damage to the rear transmission. Pneumatically actuated valves pass hydraulic fluid from a source of supply to the lock-up clutch and also, modulatably, through the rear retarder, heat exchangers associated with the rear engine, and a front engine retarder.

SPECIFICATION

Many vehicles having front and rear power units have been provided with the same transmission in each of the units in spite of the fact that the requirements of such units may be different. Thus, when one transmission is the same, with respect to the number of gear ranges and ratios, as another transmission on an associated coupled unit, without regard to the work or drive train requirements, the systems are said to be "matched."

It has been found, on the other hand, that a great deal of inefficiency and expense is inherent in matched transmission systems, since the rear transmission does not always need to be comparable to the front transmission during high speed operations. In such a case, the transmissions of the front and rear unit may be designed for the specific power requirements of each unit and different transmissions may be utilized. For example, the number of gear shift steps or the ratios in each step for the front and the rear transmissions need not be the same, and when different transmissions are utilized within a vehicle they are considered to be "unmatched." This may occur in an application wherein the front transmission is an eight forward speed unit and the rear transmission is a four forward speed unit.

In the control of any vehicle, an effective retarding mode is a necessity to insure job efficiency, brake life expectancy, and operator safety. When retarding is utilized, a high quantity of heat is generated in the hydraulic fluid passing through the retarder and this heat must be dissipated in order to protect the machinery from excessive temperatures.

Systems utilizing unmatched transmissions create the possibility of an overheating problem in certain speed combinations of the transmissions. When the front transmission is in a direct driving mode, for example, while the rear transmission is in a converter mode, if retarding is applied to the vehicle, wheel torque will attempt to drive through the slipping rear unit converter. In general, converters in reverse operation have relatively low torque capacities and the wheels are unable to drive the rear engine fast enough to provide a satisfactory coolant flow rate. Since the rate of coolant flow is proportional to engine speed, i.e., the rate of water flow through the engine and radiator is determined by the speed of the water pump, and hence the engine, the retarder fluid cannot be sufficiently cooled unless the engine is being run at a practical speed. The overheated oil may cause a breakdown of seals and a lacquering effect in the oil as well as an overheating of the parts lubricated by the oil with a resultant damage to the component parts.

In this invention, therefore, use of the combination of a locked-up converter and a retarder in the retarding mode makes possible the utilization of the effect of an overrunning load to increase the engine speed proportionally to the operating gear reduction, regardless of unmatched transmission gear ratios or steps.

It is therefore an object of this invention to provide a retarder-converter lock-up system for use in a dual power source vehicle having unmatched transmissions therein.

It is also an object of this invention to provide such a vehicle propulsion system wherein a lock-up system will engage the normal drag of a decelerated rear engine, causing that engine to operate at a speed satisfactory for cooling the hydraulic fluid passing through a retarder.

It is a further object of this invention to provide such a vehicle propulsion unit wherein the high quantity of heat generated in the hydraulic fluid of the vehicle is efficiently dissipated to protect associated hydraulic drive components.

It is a still further object of this invention to provide such a vehicle propulsion system wherein the above recited objects are achieved while using unmatched transmissions.

It is also an object of this invention to provide such a system which reduces the possibility of drive system damage which can occur during extended downhill operation due to insufficient cooling in the rear hydraulic unit.

Other objects of the invention will become apparent to those skilled in the art upon perusal of the following description in light of the accompanying drawing which illustrated a preferred embodiment of the invention. Embodiments using similar or equivalent structure will become obvious to those skilled in the art, without departing from the present invention as defined in the appended claims.

IN THE DRAWING

The figure shows a schematic illustration of the hydraulic and pneumatic control system for the converter-retarder lock-up of the instant invention.

DETAILED DESCRIPTION

An engine 11, show in the figure, is the rear engine in a two-engine vehicle, for example—a scraper. An output shaft 13 of the engine provides a direct mechanical connection to a shaft 15 which powers a rear transmission (not shown) by means of a clutch 17 and a fluid connection to the shaft by means of a torque converter 19. A retarder rotor 21 is mounted on shaft 15 and cooperates with a stator 23 in a manner to be described.

A manually controlled air valve 25 is shown which receives a supply of air through a line 27 and exhausts excess air through a line 29. The valve may be of any suitable type which will provide the modulated operation called for in this invention and may be of the type disclosed in U.S. Pat. 3,057,666, issued Oct. 9, 1962. Valve 25 supplies air between predetermined values, e.g., 25 and 80 p.s.i., to conduits 31, 33 and 39.

Air supplied to conduit 33 is delivered to a chamber 36 of a lock-up clutch valve 38. A spool 40 of the valve moves rightwardly against the bias of a spring 41. When the valve 25 is actuated to any degree, the spool 40 is moved rapidly to the position shown in the figure due to the fact that the biasing force of spring 41 is less than the exemplary 25 p.s.i. Hydraulic supply pressure, having a maximum pressure of approximately 250 p.s.i., is delivered to the valve by a conduit 43 and passed to the lock-up clutch 17 via an annulus 45, an annulus 47, and a conduit 49. A drain 51 is provided in the valve to drain the lock-up clutch, when desired, and to relieve any leaking air and oil which passes the seals of the valve.

The air passing through the valve 25 and delivered to conduit 31 is passed to a retarder control valve 52 which may be of similar construction as that described in U.S. Pat. 3,386,540 issued June 4, 1968. When the air pressure in a chamber 53 has reached some predetermined value above 25 p.s.i., e.g., 50 p.s.i., the spool 55 of the valve will have been moved rightwardly to the position shown in the figure. In that spool position, the valve receives hydraulic fluid from the torque converter 19 via a conduit 57 and passes that fluid to the retarder via a conduit 59, and also receives fluid from the retarder via a conduit 61 and passes it through heat exchangers 65 and 63 via conduits 67, 69, and 71, before causing the fluid to be returned to the transmission lubrication system via a conduit 64.

Air delivered by the manual air valve 25 to conduit 39 is also passed to the front retarder controls (not shown) for actuation of the front retarder. If desired, the front and rear retarders may be of different capacities so that the rear retarder may be fully actuated at about 50 p.s.i. and the front actuator may be fully actuated at some higher value, e.g., 80 p.s.i. Of course, the retarders are respectively modulatably actuated below such pressures.

Thus, when the operator actuates manual air valve 25, air at a relatively low pressure is applied to the lock-up clutch valve 38 causing clutch 17 to be locked-up, thereby providing a direct mechanical connection between shaft 15 and shaft 13 as well as providing a small amount of retarding effect through the torque converter 19 since one element thereof is always fixed against rotation. Fluid is delivered to the cups of retarder stator 23, causing a reaction as a result of the motion of rotor 21 in the fluid. As pressure rises in line 31, the reaction becomes greater and the engine is more responsive to wheel speed. In other words, normal engine drag takes effect when actual hydrodynamic retardation of the rear unit commences, and increases as the operator increases the air pressure, thereby increasing hydraulic fluid cooling.

Simultaneously, the minimum pressure, e.g., 25 p.s.i., in conduit 39 causes initial retarding in the front unit. If the front retarder is of a lesser capacity than the rear retarder, as air pressure in conduits 31 and 39 increases from 25 p.s.i towards the exemplary 80 p.s.i., it passes the pressure at which maximum retardation in the rear unit retarder is achieved. Further manually controlled increase of pressure through valve 25 increases the front unit retarder function as a last phase of total vehicle retarding.

Thus the applicants have provided a converter-retarder lock-up system which is capable of superior performance and increased safety in dual power source vehicles utilizing unmatched transmissions and which, while illustrated and described as a single preferred embodiment of the invention, is capable of variation and modification within the purview of the following claims.

What is claimed is:

1. In a vehicle having a drive engine; a torque converter and a retarder connecting the engine and its transmission, a lock-up clutch fixed across said torque converter, and means connected to the clutch and retarder for actuating the clutch only when the retarder is actuated, to produce a direct mechanical connection between said engine and its transmission.

2. The invention of claim 1 including second means modulatably actuating said retarder and regulating the passage of fluid from said retarder to heat exchangers through which coolant from said engine is circulated.

3. The invention of claim 2 including means for modulatably actuating a retarder on a second drive engine.

4. The invention of claim 2 wherein said means for modulatably actuating said retarder also includes means for modulatably actuating a second engine retarder.

5. The invention of claim 1 wherein said means actuating said clutch include a pneumatically actuated valve which controls hydraulic pressure in said clutch.

6. The invention of claim 1 including means for actuating said retarder, which means include a pneumatically actuated valve which controls hydraulic flow in said retarder and subsequently directs said flow through a cooling system.

7. The invention of claim 1 including pneumatic valve means which: actuates a valve which, in turn, actuates said clutch; actuates a retarder control valve which controls the flow of fluid through said retarder; and creates an actuating signal for a retarder for a second engine.

8. A vehicle having front and rear drive engines, front and rear unmatched transmissions for said front and rear engines, respectively, a torque converter-retarder system, including a torque converter, retarder, and lock-up clutch, between one of said engines and its respective transmission, a retarder in the other of said engines, a first hydraulic valve associated with said lock-up clutch, a second hydraulic valve associated with said retarder in said torque converter-retarder system, and a manually actuatable pressure valve means which produces a modulatable pneumatic signal, said signal
   (a) actuating said lock-up clutch in said torque converter-retarder system via said first hydraulic valve,
   (b) controlling the flow of fluid through said retarder in said torque converter-retarder system via said second hydraulic valve, and
   (c) creating an actuation signal for said retarder in the other of said engines,
said steps occurring during actuation of said pressure valve, producing increasing pneumatic pressure.

References Cited

UNITED STATES PATENTS

| | | |
|---|---|---|
| 2,827,989 | 3/1958 | Christenson. |
| 2,956,449 | 10/1960 | Foerster _____ 192—3.23 XR |
| 3,241,399 | 3/1966 | Fisher et al. _____ 192—3.23 XR |
| 3,319,746 | 5/1967 | Christenson et al. _ 192—3.34 XR |

BENJAMIN W. WYCHIE III, Primary Examiner

U.S. Cl. X.R.

180—70; 188—90; 192—.098, 3.3, 12